Oct. 25, 1966 A. J. BARACKET 3,281,707
PHASE AND AMPLITUDE EQUALIZING AMPLIFIER FOR
A TELEVISION TRANSMISSION SYSTEM
Filed Feb. 8, 1963
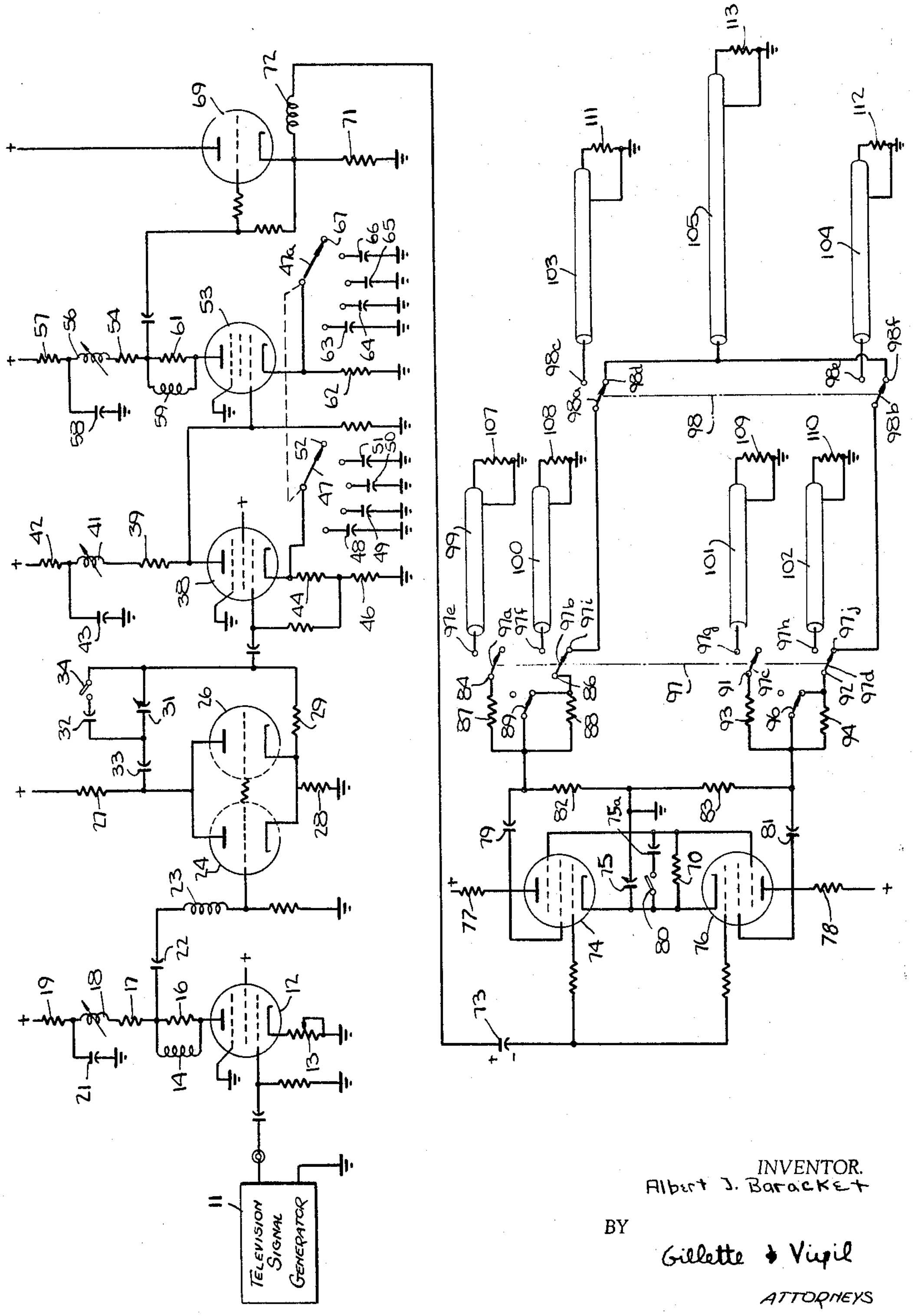
INVENTOR.
Albert J. Baracket
BY
Gillette & Vigil
ATTORNEYS United States Patent Office 3,281,707

Patented Oct. 25, 1966

3,281,707

PHASE AND AMPLITUDE EQUALIZING AMPLIFIER FOR A TELEVISION TRANSMISSION SYSTEM

Albert J. Baracket, Lancaster, Ohio, assignor to Diamond Power Specialty Corporation, Lancaster, Ohio, a corporation of Ohio Filed Feb. 8, 1963, Ser. No. 257,315

1 Claim. (Cl. 330—117)

This invention relates to an amplifier system for equalizing the overall response characteristics of certain portions of a television transmission system.

It is not unusual for television signals to have to be transmitted fairly long distances over transmission lines, such as coaxial cables, from the place at which the signals are generated or from some operating center, to a point of utilization, such as another center of operations or a transmitter. However, such long distance transmission adversely affects the quality of the signals and, added to certain other adverse effects arising in other parts of the overall system, including the camera or like device in which the signals are generated, creates problems which it is the principal object of this invention to solve.

One problem arising from the long transmission cable is a deterioration of the signal-to-noise ratio due to noise signals picked up by the television signal en route. This problem is further aggravated by attenuation of the signal due to the length of the cable and to losses due to leakage and resistance therein. Beyond these adverse effects, the transmission cable may have poor amplitude-versus-frequency and phase-versus-frequency characteristics that distort the signal, and transients and streaking may occur in the transmitted television image due to phase distortion and termination problems. Problems arising from other parts of the overall system include so-called aperture distortion which is caused by the finite (rather than the desired infinitesimal) size of the scanning electron beam or spot in the camera or other television signal generator.

All of the foregoing problems may be solved simultaneously by means of the equalizing amplifier of the present invention which includes means for amplifying and pre-correcting the signal for phase-versus-frequency characteristics and, independently for amplitude-versus-frequency characteristics of a transmission line. At the same time, corrections are made to compensate for the aperture effect. Contrary to prior practice, the equalizing amplifier is connected ahead of the transmission line in the overall system, rather than behind it, and the output signal of the equalizing amplifier has a high enough amplitude to provide a relatively high-amplitude output signal at the far end of the transmission line.

One of the objects of the present invention is to provide means for supplying a properly pre-corrected, suitably amplified television signal to a transmission line so as to minimize distortion due to passage of the signal through the line and to maintain the highest possible ratio of signal amplitude to noise amplitude.

Another object is to provide means in an equalizing amplifier for television systems to make aperture distortion correction without affecting low-frequency response, and in particular, to make aperture distortion correction without the need for repeated adjustment of overall television picture contrast and brightness controls of the monitor on which the image is displayed.

Other objects will become apparent from the following specification together with the drawing in which the only figure is a schematic diagram of an equalizing amplifier and television system according to the invention.

In the drawing reference numeral 11 indicates a television signal generator, such as a television camera, a flying spot scanner or the like. The output signal of the generator 11 is connected, perhaps by way of intermediate amplifiers or perhaps directly, as circumstances demand, to the input circuit of an equalizing amplifier. The amplifier includes a first tube 12 having a rheostat 13 connected in its cathode circuit as a volume control for the whole amplifier. The plate load of tube 12 includes a series peaking coil 14 in parallel with a resistor 16 and in series with a plate load resistor 17. The latter is connected in series with an adjustable shunt peaking coil 18 and a de-coupling circuit comprising a resistor 19 and a capacitor 21.

The output signal of the first stage of the amplifier is coupled by means of a capacitor 22 and another series peaking coil 23 to the grids of two sections 24 and 26 of an amplifier tube connected in parallel to form a paraphase amplifier with equal plate and cathode loads 27 and 28, respectively. A series phase-shifting circuit comprising a resistor 29 and capacitors 31 and 32 is connected between the plates and cathodes of tube sections 24 and 26. While another capacitor 33 is also connected in the same series circuit, its capacitance is relatively large and its reactance, therefore, is negligible in comparison with other impedances in that part of the circuit so that it has substantially no effect on the phase of the electrical signal. Capacitor 32 is connected in series with a switch 34 to be switched in parallel with the variable capacitor 31 if necessary for maximum phase correction. The anode load resistor 27 and cathode load resistor 28 have relatively low resistance to minimize the effect of stray capacitances on the phase compensating amplifier at high frequencies.

The output signal of the phase compensating amplifier is capacitor-coupled to the first tube 38 of a two-stage amplifier for correcting the overall amplitude-versus-frequency characteristic. The anode circuit of this tube includes a resistor 39 and a variable shunt peaking coil 41, as well as a decoupling resistor 42 and capacitor 43. The cathode circuit includes resistors 44 and 46 and a switch 47 to connect the resistors 44 and 46 to a plurality of frequency-compensating capacitors 48–51 or to an unconnected contact 52. The anode of the second stage, which comprises a tube 53 having an anode load resistor 54 and a variable shunt peaking coil 56 connected to a decoupling resistor 57 and capacitor 58. For additional high-frequency compensation, a series peaking coil 59 in parallel with a resistor 61 is also connected between the anode of tube 53 and the load resistor 54. The cathode circuit includes resistor 62 and a second section **47*a* of the switch 47. The arm of section 47*a* connects the cathode of tube 53 to a plurality of frequency compensating capacitors 63–66 and to an unconnected contact corresponding to the capacitors 48–51 and contact 52, respectively, in the cathode circuit of the first frequency correction amplifier 38**.

The output signal of the second frequency correction amplifier 53 is capacitor-coupled from the junction of the load resistor 54 and the series peaking coil 59 to the grid of a tube 69 connected as a cathode follower with a cathode load resistor 71. The cathode follower 69 provides a low-impedance signal connection, by way of a series peaking coil 72 and a condenser 73 of high capacitance, to the grids of two, separate amplifiers 74 and 76. The latter tubes have a common cathode bias resistor 70 shunted by an adjustable capacitor 75 for making fine adjustments in the frequency response of the amplifiers 74 and 76. The capacitor 75 may also be shunted with another capacitor **75*a* by means of a switch 80** to place the over-all capacitance in the proper operating range.

Each of the amplifiers 74 and 76 has a plate load resistor, identified by reference numbers 77 and 78, respectively, of sufficiently high impedance to permit the amplifiers to achieve the necessary voltage gain, but of sufficiently low impedance to avoid being unduly influenced by stray capacities and the low impedance loads of the transmission lines that may be connected to the amplifiers. While shown as pentodes (type 6CL6 tubes have been used successfully in practice) the tubes 74 and 76 are connected as triodes with the screen of each tube connected directly to the anode of the same tube. The output circuits of the two tubes include coupling capacitors 79 and 81 and resistors 82 and 83, respectively. Two output terminals 84 and 86, suitable for connection to transmission lines, such as coaxial cables, are connected by means of resistors 87 and 88 to the output circuit capacitor 79 of amplifier tube 74, although, for purposes later to be explained, the resistor 88 is short-circuited by a switch 89. Similarly, output terminals 91 and 92 are connected by a pair of resistors 93 and 94, the latter of which is short-circuited by a switch 96, to the output circuit capacitor 81 of the amplifier tube 76.

The output terminals 84, 86, 91, and 92 of the equalizing amplifier may be connected in various ways to from one to four utilization circuits. To illustrate this, they are shown connected by switches 97 and 98 to several coaxial cables 99–105, each of which is terminated by a suitable load impedance 107–113, respectively. The switch 97 has four arms **97*a*–97*d*, each of which may be switched to either of two contacts. The upper contacts 97*e*–97*h* are connected to individual coaxial cables 99–102 while only two of the lower contacts 97*i* and 97*j* are utilized and these are connected, respectively, to the arms 98*a* and 98*b* of the switch 98**.

The upper arm **98*a* of the switch 98 has two contact positions 98*c* and 98*d* to which it may be thrown while the lower arm 98*b* also has two contact positions 98*e* and 98*f*. The upper contact positions 98*c* and 98*e* of the two arms 98*a* and 98*b* are connected to two coaxial cables 103 and 104 which are indicated as being of intermediate length while the lower arms 98*d* and 98*f* are short-circuited together and connected to a single cable 105 indicated as being of greater length than any of the other cables 99–104**.

The operation of the circuit will first be considered as it applies to aperture correction of distortion that originates in the television signal generator 11. Generator 11 is first adjusted to produce a television signal corresponding to a known test pattern and the switch sections 47 and **47*a* are set respectively to contacts 52 and 67 so that the frequency correction circuit does not emphasize any particular frequency but simply operates as a relatively broad band signal amplifier. The television signal across one of the output impedances 107–113 is applied to a television monitor so that the television image may be examined. If examination indicates one or more extraneous vertical white lines before or after vertical black lines in the television image, the phase compensating capacitor 31 and, if necessary, capacitor 32** are adjusted to remove these white lines or, if that is impossible, to distribute them as evenly as possible across the television image.

The phase compensating amplifier tubes 24 and 26 really operate in parallel as if they were, in effect, a single tube. Substantially the same signal that is applied to the grids of these tubes appears at their common cathodes and a polarity-inverted replica of this signal appears at their anodes. Both of these latter signals are connected to the grid of tube 38, but the circuit path through which the signal from the common anodes of tubes 24 and 26 has to pass includes a relatively low-capacitance condenser 31, which has a reactive effect on the signals passing through it, while the signals from the common cathodes pass through a resistor 29, which has a different effect. Any given frequency component of the signal applied to the grids of tubes 24 and 26 has its phase shifted by an amount determined by the relative capacitive reactance of capacitor 31 (and capacitor 32 if the switch 34 is closed) and the resistance of resistor 29. Since capacitive reactance is inversely proportional to frequency, the phase shift of different frequency components differs. By adjusting capacitor 31 (and adding capacitor 32), the desired phase shift over the whole operating band may be obtained. In practice, the magnitude of capacitive reactance of capacitor 31 may be greater than the resistance of resistor 29 over most of the band of frequencies of the television signal so that maximum phase shift is achieved at the upper frequencies.

After this initial phase compensation adjustment the switch sections 47 and **47*a* should be adjusted to make contact with the particular capacitors 48–51 and 63–66, respectively, to achieve the best resolution of the television image. It may be that this will introduce some phase distortion into the image and this can then be corrected by readjusting the phase correction capacitor 31**.

The amplitude-versus-frequency change effected by the two stages 38 and 53 is due to the fact that the amplification of the signal applied to the grids of these stages is in part determined by the amount of degeneration due to impedances in the cathode leads of the tubes. These impedances include resistors 44 and 46 in the cathode circuit of tube 38 and resistor 62 in the cathode circuit of tube 53. When the switch sections 47 and **47*a* are on contacts 52 and 67, the impedances are greatest and are substantially purely resistive, which means that they affect the gain of the tubes 38 and 53 the same for all frequencies. However, when the switches 47 and 47*a* are turned so as to place one of the capacitors 48–51 in parallel with resistors 44 and 46, the degeneration of the cathode circuit of the first stage 38 is no longer a constant value for all frequencies. Instead, it is a lower value for higher frequencies, the exact value depending on which of the capacitors 48–51 is connected to the switch 47, and therefore the gain of the first stage 38 is greater for high frequencies than for low. This same effect takes place in the second stage 53, and since the two stages are in cascade, the change of frequency response is made all the greater. By setting switches 47 and 47*a* to connect proper ones of capacitors 48–51 and 63–66, respectively, the over-all amplitude-versus-frequency characteristic can be adjusted to compensate for the high-frequency attenuation resulting from aperture distortion. Additional frequency correction is provided by the capacitors 75 and 75*a* in the common cathode circuit of the output tubes 74 and 76**.

A unique feature of the equalizing amplifier of the present invention, which distinguishes it from other commercially available units, is the fact that the aperture correction does not affect signal level or low frequency response. It thereby obviates the need for repeated adjustment of over-all picture contrast and brightness controls of the monitor while the correction is being made.

Substantially the same procedure is used to correct for distortions caused by lengthy cables connecting the output of the equalizing amplifier to subsequent equipment. While in the normal situation the output of the equalizing amplifier will be connected to only one or two cables, the drawing illustrates seven cables in order to demonstrate the versatility of the amplifier. With the switches 97 and 98 in the positions shown, the output signals of the two amplifier tubes 74 and 76 are connected in parallel and applied to the input of the longest of the cables, indicated by reference character 105. Since the two amplifier tubes 74 and 76 are energized with the same signal their output signals will be in phase and, when these in-phase signals are added together, the effect will be to energize the cable 105 with a lower impedance source than would be possible if either of the tubes 74 or 76 were used alone. Of course the switches 97 and 98 may be omitted and the output terminals 86 and 92 may be wired directly to the input of cable 105. Distortions in this cable may then be corrected by connecting across the load impedance 113 a television monitor and then going through the same correction process of adjusting the capacitor 31 and the switches 47 and 47*a* as was described in connection with the aperture correction for the television signal generator 11. Of course the impedance 113 will normally be at a considerable distance from the equalizing amplifier and some means will have to be provided to relay the information back to the operator so that the capacitor 31 and the switch sections 47 and 47*a* can be adjusted properly. One way in which this can be done is by having an observer who can see the television monitor telephone information back to the operator of the equalizing amplifier.

When the two tubes 74 and 76 are connected in parallel they are capable of supplying to a 75 ohm line 105 an input signal having a peak to peak voltage of as high as 7 to 10 volts. I have found that for a very long cable it is surprisingly advantageous to have this high a voltage and that it permits precorrection of amplitude and phase distortions by means of the amplitude compensating tubes 38 and 53 and the phase compensating tubes 24 and 26 while simultaneously improving the signal-to-noise ratio. For cables of more moderate length, such as are illustrated by cables 103 and 104, the output voltage across the low impedances 111 and 112, respectively, might exceed the permissible maximum which is around 1 volt for connection to input circuits of normal television equipment if the output signals of tubes 74 and 76 were added together. Therefore, the switch 98 is arranged so that when the operator desires to connect the equalizing amplifier to cables of medium length such as cables 103 and 104 the output signals of the two tubes 74 and 76 are not connected together but instead each tube is connected to one of the cables. Correction for distortions is, of course, carried out in the same way as before. When so connected, each of the tubes 74 and 76 is capable of supplying a signal having approximately 3.5 volt peak to peak amplitude to the input of its respective cable.

The equalizing amplifier of the invention may also be used as a distribution amplifier to provide four dependent output signals. For this purpose the two switches 89 and 96 should be moved to their alternate positions so that they no longer short-circuit the resistors 88 and 94, respectively. Also the switch 97 should be thrown to its alternate position to connect the output terminals 84 and 86 to the cables 99 and 100, respectively, and the terminals 91 and 92 to cables 101 and 102, respectively. Opening the switches 89 and 96 provides extra isolating resistors in the output circuits of the tubes 74 and 76. For example there would be two isolating resistors 87 and 88 between the cables 99 and 100 to prevent interaction thereof. Similarly there would be two isolating resistors 93 and 94 between the cables 101 and 102. When so connected it is possible to supply four independent output signals each having a peak-to-peak voltage of as much as 1.5 volts to the four transmission lines 99–102.

While this invention has been described in terms of a specific embodiment it will be appreciated by those skilled in the art that modifications may be made therein without parting from the true scope of the invention as defined by the following claim.

What is claimed is:

An equalizing amplifier comprising a phase compensating circuit comprising an amplifier having two output terminals providing opposite polarity signals, substantially equal load impedances connected to said terminals, and a series circuit comprising a variable capacitor and a resistor connected in series between said terminals; an amplitude compensating circuit connected to the junction of said capacitor and said resistor to be energized by the signal thereat, said amplitude compensating circuit comprising a pair of amplifiers connected in cascade, each of said amplifiers having a degenerative circuit connected thereto and comprising a resistor and a plurality of capacitors and switch means to connect their respective resistor in parallel with one of said plurality of capacitors; an output circuit comprising a second pair of amplifiers having a common input circuit connected to the output circuit of said amplitude compensating circuit and having separate output circuits; a transmission line having phase-versus-frequency and amplitude-versus-frequency characteristics complementary to those of said phase compensating circuit and said amplitude compensating circuit, respectively; and connections from both of said output circuits of said second pair of amplifiers to the input of said transmission line to supply a relatively high level signal thereto.

References Cited by the Examiner

UNITED STATES PATENTS

| | | | |
|---|---|---|---|
| 2,178,012 | 10/1939 | White | 323—119 X |
| 2,706,265 | 4/1955 | Buehler | 330—124 X |
| 2,949,605 | 8/1960 | Graziano et al. | 330—153 X |
| 2,958,831 | 11/1960 | Clark | 333—28 |
| 3,130,362 | 4/1964 | MacMillan | 323—128 X |

OTHER REFERENCES

Creamer: "Line Equalization by Predistortion," Proc. IRE, vol. 27, pages 22–23, January 1939.

Angelo: Electronic Circuits, McGraw-Hill, N.Y., 1958, TK7870, A58, page 134.

ROY LAKE, *Primary Examiner.*

R. P. KANANEN, N. KAUFMAN, *Assistant Examiners.*